W. A. STOLLEY.
FISH BAIT OR LURE.
APPLICATION FILED DEC. 26, 1919.
1,430,336.
Patented Sept. 26, 1922.
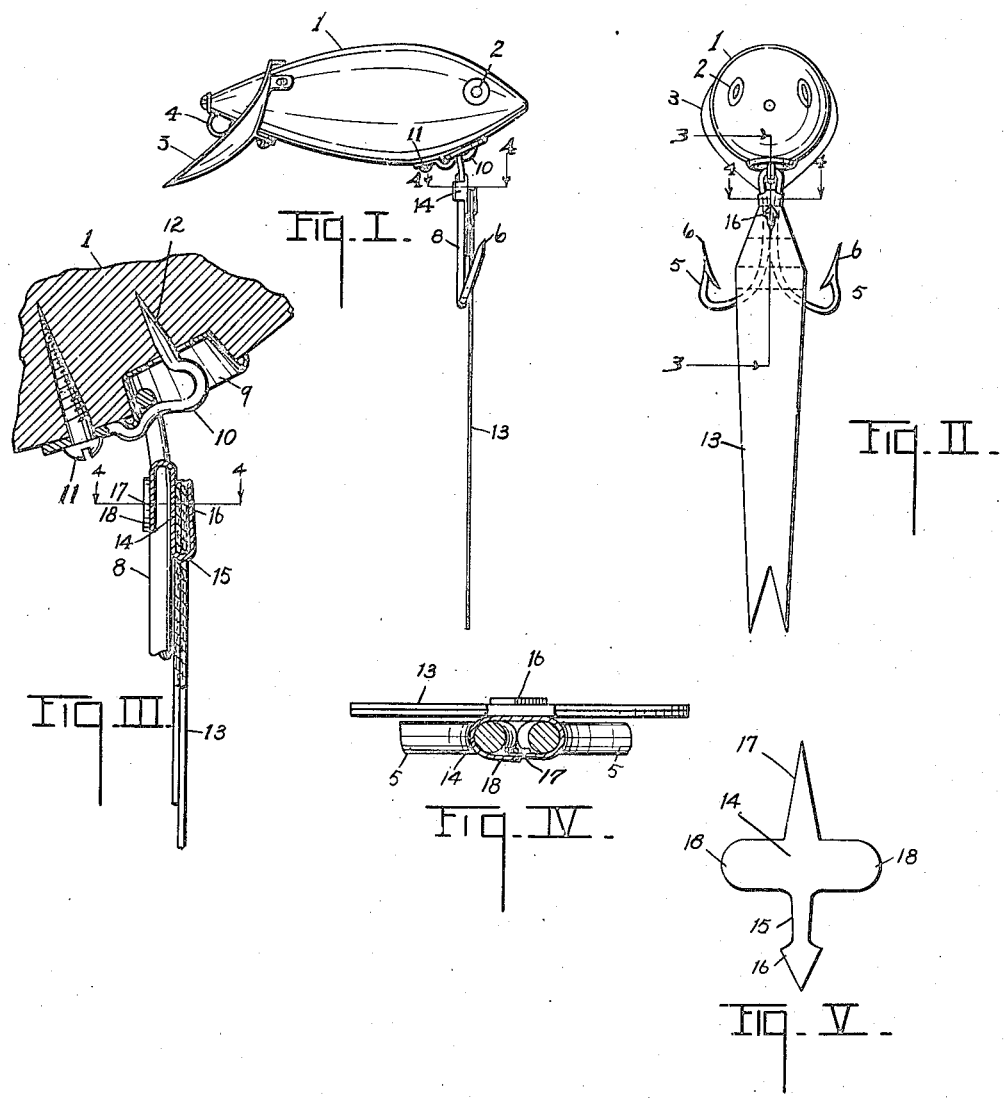
Inventor
William A. Stolley
Witnesses
By Chappell & Earl
Attorneys Patented Sept. 26, 1922.

1,430,336

UNITED STATES PATENT OFFICE.

WILLIAM A. STOLLEY, OF DOWAGIAC, MICHIGAN, ASSIGNOR TO JAS. HEDDON'S SONS, OF DOWAGIAC, MICHIGAN.

FISH BAIT OR LURE.

Application filed December 26, 1919. Serial No. 347,413.

*To all whom it may concern:*

Be it known that I, WILLIAM A. STOLLEY, a citizen of the United States, residing at Dowagiac, county of Cass, State of Michigan, have invented certain new and useful Improvements in Fish Baits or Lures, of which the following is a specification.

This invention relates to improvements in fish baits or lures.

The main objects of this invention are to provide an improved fish bait or lure which is very efficient in catching fish, and at the same time is durable and simple and economical in structure.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Fig. I is a side view of a structure embodying the features of my invention, a portion of the streamer or flexible strip being broken away.

Fig. II is a rear elevation, the submerging collar being omitted.

Fig. III is an enlarged detail section on a line corresponding to line 3—3 of Fig. II, showing details of the hook attaching means and the means for attaching the flexible strip or streamer to the hook shank.

Fig. IV is an enlarged detail section on a line corresponding to line 4—4 of Figs. I, II and III.

Fig. V is a plan view of the streamer attaching device.

Referring to the drawing, the body 1 is, in the structure illustrated, tapered outwardly at both ends, the front taper being substantially longer than the rear. The body is designed so that it shall have the appearance of traveling backward, it being provided with eyes 2 at its rear end. At its forward end the body is provided with a downwardly and forwardly projecting collar 3, the collar shown being concavo-convex which, when the bait is drawn through the water, causes it to dive and also swing from side to side producing a swimming movement effect. The line attaching eye 4 is disposed in front of the collar on the under side of the body.

The hook 5, as illustrated, is a double hook, that is, it is provided with two barbed points 6, the points being directed upwardly. The hook is formed of a single piece of wire folded upon itself forming the eye 7 and the shank 8. The hook is attached to the body so as to swing and move freely, but so as to prevent its rotation. The attachment in the structure illustrated comprises a socket 9 set into the under side of the body at its rear end and the attaching device 10 having an eye at one end to receive the screw 11 and a prong 12 at its other end driven into the body centrally through the socket.

The streamer 13 is of flat thin flexible material, preferably resilient. The front end of the streamer is secured to the shank of the hook so that the streamer normally hangs or lies between the points of the hooks as shown, and extends a substantial distance to the rear thereof. The strip 13 is secured to the hook preferably by means of the cruciform attaching device designated generally by the numeral 14 as shown in Fig. V.

The lower longitudinal arm 15 of this attaching device is provided with a head 16 which is passed through the strip 13 and folded down thereon. The upper longitudinal arm 17 is tapered and is arranged through the eye of the hook and folded down against the shank, it being tapered so that it lies between the two members of the shank as shown in Fig. IV. The side or transverse arms 18 are folded or clamped about the shank over the arm 17 so that it can not open. The attaching device may be formed of thin flexible metal and at the same time have sufficient strength to effectively retain the strip 13.

My improved bait or lure is efficient and has a novel and attractive appearance. I have not attempted to illustrate or describe certain other embodiments or adaptations as I believe the disclosure made will enable those skilled in the art to which my invention relates to embody or adapt the same as may be desired.

Having thus described my invention, what I claim as new and desire to secure by Letters Patent is:

1. In a fish bait or lure, the combination with a body provided with a downwardly and forwardly directed collar at its front end, of a double hook having upwardly directed points, hook attaching means whereby the hook is loosely and nonrotatably supported on the under side of said body at the rear end thereof, a streamer lying normally between the points of the hook, and a cruciform attaching device for said streamer having its lower longitudinal arm engaged with the front end of the streamer and its upper longitudinal arm engaged with the eye of the hook and its transverse arms clamped about the shank of the hook.

2. In a fish bait or lure, the combination with a body provided with a downwardly and forwardly directed collar at its front end, of a double hook having upwardly directed points, hook attaching means whereby the hook is loosely and non-rotatably supported on the under side of said body at the rear end thereof, and a streamer having its front end attached to the upper end of the shank of the hook and lying normally between the points thereof.

3. In a fish bait or lure, the combination with a body, of a hook secured thereto, a flat flexible strip, and a cruciform attaching device for said strip having its lower longitudinal arm engaged with the eye of the hook and its transverse arms folded about the shank of the hook.

4. In a fish bait or lure, the combination with a body provided with a line attaching means at its front end and means for causing it to submerge as it is drawn through the water, a double hook having upwardly directed points loosely non-rotatably attached to the under side of said body, and a flexible strip attached at its forward end to the shank of the hook and lying normally between its said upturned points and trailing a substantial distance at the rear thereof.

5. In a fish bait or lure, the combination with a body provided with a line attaching means at the front, means for causing the body to submerge as it is drawn through the water, a hook fastened on the under side of said body adjacent to the rear end thereof, said fastener engaging the eye of the hook so that the depending hook swings freely thereon, a flat flexible strip adapted to the shank of the hook adjacent its point of attachment to the body, but being otherwise adapted and free to swing with the hook and to flutter independently thereof and trail a substantial distance beyond the end of the hook.

6. In a fish bait or lure, the combination of a double hook having upwardly directed points, a streamer lying normally between the points of the hook, and a cruciform attaching device for said streamer having its lower longitudinal arm provided with a head disposed through the front end of the streamer and folded thereon, and its upper longitudinal arm disposed through the eye of the hook and folded downwardly upon its shank and its transverse arms clamped about the shank upon such longitudinal arm.

7. In a fish bait or lure, the combination with a body of a hook attaching means on said body engaging the eye of the hook so that the hook swings freely from its attaching means, a flat flexible strip and a device for attaching said strip to said hook comprising a part inserted through the fold upon the strip, the part folded around the shank of the hook and the part disposed through the eye of the hook independent of said hook attaching means.

8. In a fish bait or lure, the combination of a hook, a flat flexible strip, a device for attaching said strip to said hook comprising a part engaging the end of the strip, a part clamped around the shank of the hook, and a part disposed through the eye of the hook so as to leave the eye unobstructed to receive an independent hook attaching means.

9. In a fish bait or lure, the combination of the body provided with means causing it to submerge when it is drawn through the water, a multiple pointed hook attached to the under side of said body so that it swings freely therefrom, but is non-rotatable, a flat flexible strip attached to the shank of the hook adjacent the body, but otherwise unattached, and so that it lies normally above the shank and between the points of the hook and trails a substantial distance beyond the end of the hook.

10. In a fish bait or lure, the combination of a hook, a flat flexible strip, and a cruciform attaching device for said strip having its longitudinal arms engaged with the strip and the eye of the hook and its transverse arms folded about the shank of the hook.

In witness whereof, I have hereunto set my hand and seal in the presence of two witnesses.

W. A. STOLLEY. [L. S.]

Witnesses:
H. L. CAMERON,
L. J. WOOSTER.